United States Patent
Koob et al.

(10) Patent No.: US 9,658,793 B2
(45) Date of Patent: May 23, 2017

(54) ADAPTIVE MODE TRANSLATION LOOKASIDE BUFFER SEARCH AND ACCESS FAULT

(71) Applicant: QUALCOMM Incorporated, San Diego, CA (US)

(72) Inventors: Christopher Edward Koob, Round Rock, TX (US); Erich James Plondke, Austin, TX (US); Jiajin Tu, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 14/627,433

(22) Filed: Feb. 20, 2015

(65) Prior Publication Data
US 2016/0246534 A1    Aug. 25, 2016

(51) Int. Cl.
G06F 12/00    (2006.01)
G06F 13/00    (2006.01)
(Continued)

(52) U.S. Cl.
CPC ............... G06F 3/0634 (2013.01); G06F 1/32 (2013.01); G06F 3/0604 (2013.01);
(Continued)

(58) Field of Classification Search
CPC ...... G06F 1/3203; G06F 3/0604; G06F 3/061; G06F 3/0611; G06F 3/0613; G06F 3/0625; G06F 3/0628; G06F 3/0629; G06F 3/0631; G06F 3/0632; G06F 3/0634; G06F 3/0635; G06F 3/0637; G06F 3/0646; G06F 3/0647; G06F 3/0649; G06F 3/0653; G06F 3/067; G06F 3/0668; G06F 3/0671;
(Continued)

(56) References Cited

U.S. PATENT DOCUMENTS 3,012,227 A * 12/1961 Astrahan ............... G06F 3/0683
                                                      360/48
4,200,915 A *  4/1980 Struger ................. G05B 19/056
                                                      700/17
(Continued)

FOREIGN PATENT DOCUMENTS

EP    0297931 A2 *  1/1989    ......... G06F 13/4027
EP    1182570 A2    2/2002
(Continued)

OTHER PUBLICATIONS

Cool-Mem: combining statically speculative memory accessing with selective address translation for energy efficiency; Ashok et al; Proceedings of the 10th international conference on Architectural support for programming languages and operating systems; Oct. 5-9, 2002; pp. 133-143 (11 pages).*

(Continued)

*Primary Examiner* — Daniel C Chappell
(74) *Attorney, Agent, or Firm* — Peter Michael Kamarchik; Kenneth Vu

(57) ABSTRACT

Processor access of memory is monitored. The monitoring includes identifying the accesses being to a local memory or a non-local memory. Based on the monitoring, the processor is switched from a non-local memory access mode to a local memory access mode.

32 Claims, 3 Drawing Sheets

(51) Int. Cl.
*G06F 13/28* (2006.01)
*G06F 3/06* (2006.01)
*G06F 12/08* (2016.01)
*G06F 12/1027* (2016.01)
*G06F 1/32* (2006.01)
*G06F 9/30* (2006.01)
*G06F 12/0888* (2016.01)

(52) U.S. Cl.
CPC ............ *G06F 3/0673* (2013.01); *G06F 12/08* (2013.01); *G06F 12/1027* (2013.01); *G06F 9/30076* (2013.01); *G06F 12/0888* (2013.01); *G06F 2212/1016* (2013.01); *G06F 2212/1028* (2013.01); *G06F 2212/502* (2013.01); *Y02B 60/1225* (2013.01)

(58) Field of Classification Search
CPC .... G06F 3/0673; G06F 3/0674; G06F 3/0676; G06F 3/0677; G06F 3/0679; G06F 3/068; G06F 3/0683; G06F 3/0688; G06F 11/34; G06F 9/3004; G06F 9/30043; G06F 9/30189; G06F 9/34; G06F 9/342; G11B 27/36
USPC .......................................................... 711/154
See application file for complete search history.

(56) References Cited

U.S. PATENT DOCUMENTS

| | | | |
|---|---|---|---|
| 5,113,511 A * | 5/1992 | Nelson ................ | G06F 12/0215 365/230.01 |
| 5,386,563 A * | 1/1995 | Thomas .................. | G06F 9/462 710/260 |
| 5,996,051 A * | 11/1999 | Mergard ............. | G06F 13/1647 710/14 |
| 6,336,162 B1 * | 1/2002 | Ueda ................... | G06F 12/0215 365/203 |
| 6,412,056 B1 | 6/2002 | Gharachorloo et al. | |
| 6,697,916 B2 | 2/2004 | Lasserre et al. | |
| 6,779,085 B2 | 8/2004 | Chauvel | |
| 6,799,257 B2 * | 9/2004 | Sprangle ............... | G06F 13/161 711/158 |
| 7,143,203 B1 * | 11/2006 | Altmejd ................ | G06F 1/3203 710/15 |
| 7,146,469 B2 * | 12/2006 | Watanabe ........... | G06F 12/0862 711/141 |
| 7,177,996 B2 | 2/2007 | Ehama et al. | |
| 7,461,232 B2 | 12/2008 | Nicolai | |
| 7,516,274 B2 | 4/2009 | Moll et al. | |
| 7,653,789 B2 | 1/2010 | Wright et al. | |
| 8,200,901 B1 | 6/2012 | Wentzlaff et al. | |
| 8,639,245 B2 * | 1/2014 | Shi ........................ | H04W 8/205 455/419 |
| 2001/0021278 A1 * | 9/2001 | Fukuda ................ | G06F 9/30043 382/302 |
| 2003/0061461 A1 * | 3/2003 | Circello .................. | G06F 12/02 711/172 |
| 2004/0064655 A1 * | 4/2004 | Paulraj ................ | G06F 11/3471 711/154 |
| 2005/0091468 A1 * | 4/2005 | Morita ................ | G06F 9/30043 711/202 |
| 2006/0288243 A1 * | 12/2006 | Kim ...................... | G06F 1/3203 713/300 |
| 2007/0277023 A1 * | 11/2007 | Weiberle ............. | G06F 9/30181 712/229 |
| 2008/0147977 A1 * | 6/2008 | Toussi ................. | G06F 12/0897 711/122 |
| 2010/0293342 A1 * | 11/2010 | Morfey ............... | G06F 9/30032 711/154 |
| 2011/0072234 A1 * | 3/2011 | Chinya ............... | G06F 12/1027 711/207 |
| 2011/0093654 A1 * | 4/2011 | Roberts ................. | G06F 1/3203 711/105 |
| 2013/0007488 A1 | 1/2013 | Jo | |
| 2013/0117531 A1 | 5/2013 | Grochowski et al. | |
| 2013/0212335 A1 * | 8/2013 | Teranishi ................ | G06F 12/08 711/138 |
| 2014/0068225 A1 | 3/2014 | Plondke et al. | |
| 2014/0143577 A1 * | 5/2014 | Nachimuthu ........... | G06F 12/08 713/324 |
| 2015/0324122 A1 * | 11/2015 | Kaminaga ............... | G06F 3/061 711/103 |
| 2016/0103784 A1 * | 4/2016 | Stewart ................. | G06F 9/3004 712/3 |
| 2016/0246731 A1 | 8/2016 | Koob et al. | |

FOREIGN PATENT DOCUMENTS

| | | |
|---|---|---|
| WO | 9821712 A2 | 5/1998 |
| WO | 2007059085 A2 | 5/2007 |
| WO | 2011112523 A2 | 9/2011 |
| WO | 2013095559 A1 | 6/2013 |

OTHER PUBLICATIONS

Memory hierarchy reconfiguration for energy and performance in general-purpose processor architectures; Balasubramonian et al; Proceeds of 33rd Annual IEEE/ACM International Symposium on Microarchitecture; Dec. 10-13, 2000; pp. 245-257 (13 pages).*
International Search Report and Written Opinion—PCT/US2016/015973—ISA/EPO—Apr. 8, 2016.

* cited by examiner

ADAPTIVE MODE TRANSLATION LOOKASIDE BUFFER SEARCH AND ACCESS FAULT

FIELD OF DISCLOSURE

The present application is generally related to processor memory management.

BACKGROUND

Portable computing devices, such as wireless telephones and personal digital assistants (PDAs), continually require increased data storage capacity and processing speed. For example, a wireless telephone may concurrently serve as a digital camera; multi-media file player, and portable game player. Concurrent with increasing functionality and performance requirements, available battery volume is decreasing, e.g., due to smaller portable devices and/or volume being occupied by other hardware.

One known conventional technique for reducing power is to configure the computing device as switchable to a low power or "local memory access mode" in which access can be constrained to local memory. In the local memory access mode, a processing core may be allowed to access only a set of lower power, local resources, e.g., a local memory tightly coupled to the processing core, instead of having access to all available memory and device resources.

Conventional techniques, however, switch to the local memory access mode in response to a specific "mode switch" command. Therefore, absent such a mode switch command, external memory and other device resources can remain powered up, regardless of being unused. In addition, while in the local memory access mode, a need to quickly access the powered down external memory or other device resource may arise. However, until an explicit mode switch command is received, an attempt to perform that access can cause page faults.

SUMMARY

This Summary identifies features and aspects of some example aspects, and is not an exclusive or exhaustive description of the disclosed subject matter. Whether features or aspects are included in, or omitted from this Summary is not intended as indicative of relative importance of such features. Additional features and aspects are described, and will become apparent to persons skilled in the art upon reading the following detailed description and viewing the drawings that form a part thereof.

Methods are disclosed that can provide switching a memory access mode of a processor. Example operations in one method, according to one or more aspects, can include monitoring an accessing of memory, and a result of the monitoring can indicate whether the accessing is to a local memory or to a non-local memory. Example operations in one method, according to one or more aspects, can include switching the processor, in response to the monitoring the accessing of memory, from one of a local memory access mode and a non-local memory access mode to the other of the local memory access mode and the non-local memory access mode.

Example apparatuses are disclosed and, according to one or more aspects, can provide automatic, rule-based switching a memory access mode of a processor. Example features, in an aspect, can include a storage, and the storage may be configured to store switching rules. In an aspect, the switching rules may comprise rules for switching the access mode of the processor from one of a local memory access (LP) mode and a non-local memory access (NP) mode to the other of the LP mode and the NP mode. Example features, according to one or more aspects, can include a memory access historical/statistical record, and the memory access historical/statistical record may be configured to be updated in association with the processor accessing memory. In an aspect, the update can reflect whether the accessing is to a local memory or to a non-local memory. Example features can also include, in an aspect a switching decision logic, and the switching decision logic may be coupled to the storage and to the memory access historical record. In an aspect, the switching decision logic may be configured to switch the access mode of the processor from one of the LP mode and the NP mode to the other of the LP mode and the NP mode, based at least in part on the switching rules and the memory access historical record.

Example apparatuses according to one or more aspects can include means for monitoring an accessing of memory, wherein a result of the monitoring can indicate whether the accessing of memory is to a local memory or to a non-local memory, or both. Example features can also include, in an aspect, means for switching the processor, in response to the monitoring the accessing of memory, from one of a local memory access mode and a non-local memory access mode to the other of the local memory access mode and the non-local memory access mode.

Examples of a non-transitory computer-readable medium according to one or more aspects can comprise code, which, when executed by a processor, can cause the processor to monitor an accessing of memory, wherein a result of the monitoring can indicate whether the accessing of memory is to a local memory or to a non-local memory, and that can cause the processor to switch the access mode of a processor system, in response to the monitoring the accessing of memory, from one of a local memory access mode and a non-local memory access mode to the other of the local memory access mode and the non-local memory access mode.

BRIEF DESCRIPTION OF THE DRAWINGS

The accompanying drawings are presented to aid in the description of aspects and are provided solely for illustration and are not any limitation thereof.

DETAILED DESCRIPTION

Figure 1:
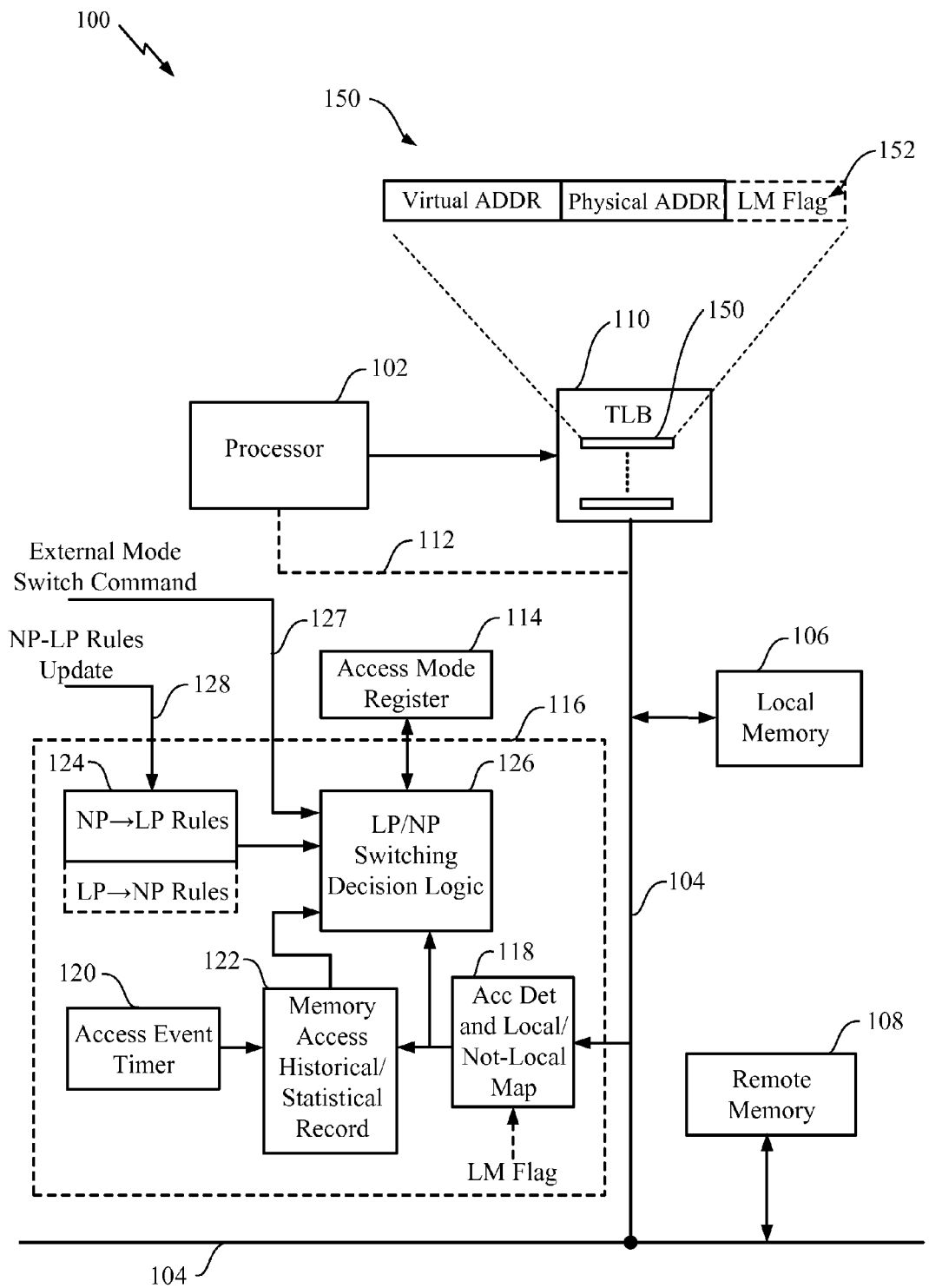
FIG. 1 shows a block schematic of one example adaptive access mode memory access processor in accordance with various aspects.

Aspects of the invention are disclosed in the following description and related drawings directed to specific exemplary aspects. Alternate aspects may be devised without departing from the scope of the invention. In certain described example implementations, instances are identified where various component structures and portions of operations can be taken from known, conventional techniques, and then arranged in accordance with one or more aspects.

In such instances, internal details of the known, conventional component structures and/or portions of operations are omitted to help avoid potential obfuscation of inventive concepts.

The terminology used herein is only for the purpose of describing particular aspects and is not intended to limit the scope of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all embodiments of the invention include the discussed feature, advantage or mode of operation.

As used herein, the singular forms "a", "an" and "the" are intended to include the plural forms as well, unless the context clearly indicates otherwise. It will be understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Certain aspects are described in terms of operations and steps, for example, in or relating to various processes of design and fabrication. It will be understood that except in instances where explicitly stated otherwise, or where made clear from a particular context, that the described order of such operations and steps is only for purposes of example, and is not necessarily limiting of the order of operations or steps that may be applied in practices according to various exemplary aspects.

In addition, operations in various processes are described in reference to flow diagrams. It will be understood that the flow diagrams do not necessarily mean that operations shown by one block terminate, or cannot continue upon commencement of operations shown by another block.

Certain aspects are described in terms of example operations, steps, actions and sequences of operations, steps and actions that can performed by or under control of, for example, a computing device or elements of a computing device. It will be understood by persons of ordinary skill, upon reading this disclosure, that such operations, steps, actions, sequences and other combinations thereof can be performed by, or under control of specific circuits (e.g., application specific integrated circuits (ASICs)), by program instructions being executed by one or more processors, or by a combination of both.

Accordingly, it will be appreciated by such persons that operations, steps, actions, sequences and other combinations thereof can be embodied entirely within any form of computer readable storage medium having stored therein a corresponding set of computer instructions that, upon execution, can cause an associated processor to perform, directly or indirectly, operations, steps, actions, sequences and other combinations described herein. Thus, the various aspects of the invention may be embodied in a number of different forms, all of which are contemplated to be within the scope of the claimed subject matter.

FIG. 1 shows one functional block diagram of one example of an adaptive memory access mode processor 100 in accordance with various aspects. It will be understood that the FIG. 1 blocks represent logical functions and do not limit hardware architectures or arrangements implementing such functions. For brevity, the phrase "adaptive memory access mode" will be abbreviated in this description as "APMA."

It will be understood that "APMA" has no meaning in this description other than being an abbreviation for "adaptive memory access mode."

Referring to FIG. 1, the APMA processor 100 can include an instruction execution circuit (hereinafter "processor") 102 which may be, for example, an ARM™ or other similar architecture microprocessor core, or any other programmable state machine capable of executing computer-executable instructions (not shown in FIG. 1). Computer-executable instructions for the processor 102 may be stored in memory resources including, for example, a local memory 106 tightly coupled to the processor 102, and a remote memory 108 that may be connected through, for example, a bus 104. It will be understood that "local" and "remote, in the context of "local memory" 106 and the "remote memory" 108, can encompass functional proximity designations in which neither of the "local memory" and the "remote memory" 106 is positioned any closer or further, respectively, from the processor 102. For example, the local memory 106 and remote memory 108 may be equidistant from the processor 102, but the local memory 106 may be coupled to the processor 102, for example, through a dedicated bus (not specifically shown in FIG. 1).

Referring to FIG. 1, in an aspect, addressing of the local memory 106 and the remote memory 108 can be through a translation lookaside buffer (TLB) 110. The TLB 110 may include a content-addressable memory (CAM) (not separately shown in FIG. 1) configured to store a plurality of virtual page translation entries 150. In an aspect, the virtual page translation entries 150 may comprise, in accordance with conventional techniques, a virtual address (visible in FIG. 1, but not separately numbered) and a physical address (visible in FIG. 1, but not separately numbered). The virtual page translation entries 150 may, in an aspect, further comprise a "local/non-local" flag field 152 holding a local/non-local flag that indicates whether the physical address in the virtual page entry is in a local (e.g., local memory 106) or non-local memory (e.g., remote memory 108. Other than the local/non-local flag field 152, structure and operation of the TLB 110 can be according to known conventional TLB techniques and, therefore, further detailed description is omitted.

In an aspect, either supplemental to or in place of the TLB 110, the processor 102 may have direct address generation capability, i.e., direct output of physical addresses, as represented by the alternate logical path 112 from the processor 102 to the bus 104.

The APMA processor 100, in an aspect, may include a register 114 that may be assigned or configured to store a flag that indicates the APMA processor 100 being in its local memory (referenced hereinafter as "LP") access mode or in its non-local memory (referenced hereinafter as "NP") access mode. The register 114 will hereinafter be referred to as the "memory access mode register" 114. The flag may be referred to as a "memory access mode flag."

In an aspect, the APMA processor 100 may include a LP/NP rule-based switch module 116. The LP/NP rule-based switch module 116 can be configured, according to various aspects, to monitor operations by the processor 103, for example, memory accesses and apply LP/NP switching rules to the monitoring to selectively switch the APMA processor between LP and NP access modes. The LP/NP rule-based switch module 116 may provide, among other features and benefits, adaptability not available using only a command-based or other specific event (e.g., activity time-out) controlled switching.

In an aspect, the LP/NP rule-based switch module 116 may comprise an access detect and local/non-local map 118 configured to detect memory accesses on the bus 104 and determine whether the accesses are to a local (e.g., local memory 106) or non-local memory (e.g., remote memory 108). The LP/NP rule-based switch module 116 may comprise, in addition, an access event timer 120 configured to apply a time stamp to memory accesses detected by the access detect and local/non-local map 118. In one alternative aspect, the access detect and local/non-local map 118 can be configured to determine whether an access is to a local or non-local memory by receiving a flag, such as the flag in the local/non-local flag field 152 of virtual page translation entries 150.

Referring to FIG. 1, in an aspect, the LP/NP rule-based switch module 116 may comprise a memory access historical/statistical record 122, which may configured to store a memory access history (not explicitly visible in FIG. 1) and memory access statistics (not explicitly visible in FIG. 1). An example memory access history stored in the memory access historical/statistical record 122 can include, for example, a record of memory accesses as detected by the local/non-local map 118 and time stamped by the access event timer 120. Memory access statistics stored in the memory access historical/statistical record 122 may further include statistical parameters that correlate with a preferred switching of the memory access mode of the APMA 102. The memory access historical/statistical record 122 may, for example, be based on, or include or reflect a sliding window history of the memory accesses as detected by the local/non-local map 118 and access event timer 120. In an aspect, the LP/NP rule-based switch module 116, or other logic, may be configured to determine characteristics and metrics of the memory accesses, and accordingly update the memory access historical/statistical record 122. Examples of such characteristics and metrics can include, for example, without limitation, frequency and quantity of memory accesses, and relative quantity and frequency of the memory accesses being to local or non-local memory. In a further aspect, the LP/NP rule-based switch module 116 may be configured to maintain in the historical/statistical record 122, in place of or in addition to the above-described sliding window history of the memory accesses, a running calculation of characteristics and metrics of the memory accesses.

Referring to FIG. 1, in an aspect, the LP/NP rule-based switch module 116 may include storage resources assigned, or dedicated to storing NP/LP switching rules. FIG. 1 shows, as one example of such storage resources, an NP/LP switching rules storage 124. In an aspect, the NP/LP switching rules storage 124 can be configured to store NP-to-LP switching rules. In a further aspect, the NP/LP switching rules storage 124 can be configured to store LP-to-NP switching rules. It will be understood that the configuration of the NP-to-LP switching rules and, if included, the LP-to-NP switching rules stored by the NP/LP switching rules storage 124 may be application specific. For example, in an aspect, NP-to-LP switching rules may include an activity time-out rule. The activity timeout rule may, for example, dictate the LP/NP rule-based switch module 116 to switch from the NP mode to the LP mode if a continuous interval of no memory accesses exceeds a given time-out duration (not explicitly visible in FIG. 1). Functionality of monitoring such intervals may be included in the access event timer 120. The activity time-out rule is only one example of NP-to-LP switching rules that may be employed. Persons of ordinary skill in the pertinent art, facing a specific application after reading this disclosure can readily configure various alternative, and additional NP-to-LP switching rules or LP-to-NP switching rules, in a manner adapted for that specific application without undue experimentation. Further detailed description of specific NP-LP switching rules is therefore omitted.

With continuing reference to FIG. 1, in an aspect, the LP/NP rule-based switch module 116 can comprise an NP/LP switching decision logic 126. In an aspect, the comprise an NP/LP switching decision logic 126 can be configured to switch the access mode of the APMA processor 100 from one of the NP mode and LP mode to the other of these access modes upon, or based at least in part on, applying of switching rules to the memory access history, or to the memory access statistics, or both. In one example, the NP/LP switching decision logic 126 can be configured, in an aspect, to apply NP-LP switching rules stored in the NP/LP switching rules storage 124 to the memory access history, or memory access statistics, or both, that are maintained in the memory access historical/statistical record 122. In a related aspect, The NP/LP switching decision logic 126 can be configured to switch the access mode of the APMA processor 100 from one of the NP mode and the LP mode to the other of these access modes upon, or based at least in part on determining that characteristics and metrics of the memory accesses meet switching decision thresholds (not separately visible in FIG. 1). The switching decision thresholds may be established, for example, by the NP-LP switching rules stored in the NP/LP switching rules storage 124. In an aspect, the NP/LP switching decision logic 126 can be configured to include setting the memory access mode flag in the access mode register 114 to indicate the switched-to access mode. In a related aspect, the NP/LP switching decision logic 126 may be configured to receive from the access mode register 114 the memory access mode flag, or receive other information identifying the access mode. In a further aspect, the NP/LP switching decision logic 126 or other logic (not necessarily visible in FIG. 1) may be configured to be provided with or to select, for example, based on the memory access mode flag in the access mode register 114, LP-to-NP switching rules when operating in the LP mode, and NP-to-LP switching rules when operating in the NP mode. In an aspect, selection can be configured to be from the NP/LP switching rules storage 124 based, for example, on the memory access mode flag in the access mode register 114.

In an aspect, the LP/NP rule-based switch module 116 may be configured to provide automatic rule-based NP-to-LP access mode switching, without automatic rule-based LP-to-NP access mode switching. In another aspect, the LP/NP rule-based switch module 116 may be configured to provide automatic rule-based LP-to-NP access mode switching, without automatic rule-based NP-to-LP access mode switching. In another aspect, the LP/NP rule-based switch module 116 may be configured to provide both automatic rule-based NP-to-LP and automatic rule-based LP-to-NP switching.

In an aspect, the NP/LP switching decision logic 126 can be configured to receive an external command, for example, the External Mode Switch Command 127 visible in FIG. 1. The External Mode Switch Command 127 may, for example, include a command (not separately visible in FIG. 1) to switch the NP/LP switching decision logic 126 to a specific one of the LP or NP access modes. The External Mode Switch Command 127 may, for example, include a command (not separately visible in FIG. 1) instructing the NP/LP switching decision logic 126 to maintain the present LP or NP access mode, irrespective of the memory access historical/statistical record 122.

In an aspect, the NP/LP switching rules storage 124 may be configured such that the NP-to-LP or the LP-to-NP switching rules, or both, can be programmable, for example, by the processor 102. In a further aspect, NP/LP switching rules storage 124 may be configured to be programmable by an external command, such as the example "NP-LP Rules Update" 128 shown on FIG. 1. In an aspect, which may be additional to or in place of the above-described programmability features of the NP/LP switching rules storage 124, NP-to-LP or LP-to-NP switching rules, or both, may be installed at time of manufacture.

The above-described blocks of the LP/NP rule-based switch module 116 are graphically represented in FIG. 1 as separate blocks for purposes of describing example operations as a sequence of component actions and example inter-dependencies. It will be understood that the FIG. 1 representation as separate blocks is not intended as limiting of the architecture of hardware, or combination hardware-software implementations, of the LP/NP rule-based switch module 116, or of any other blocks of the APMA processor 100. For example, in an aspect, the processor 102 may be configured to include circuitry (not explicitly visible in FIG. 1) that can implementing all, or various combinations and sub-combinations of the described blocks of the LP/NP rule-based switch module 116.

Figure 2:
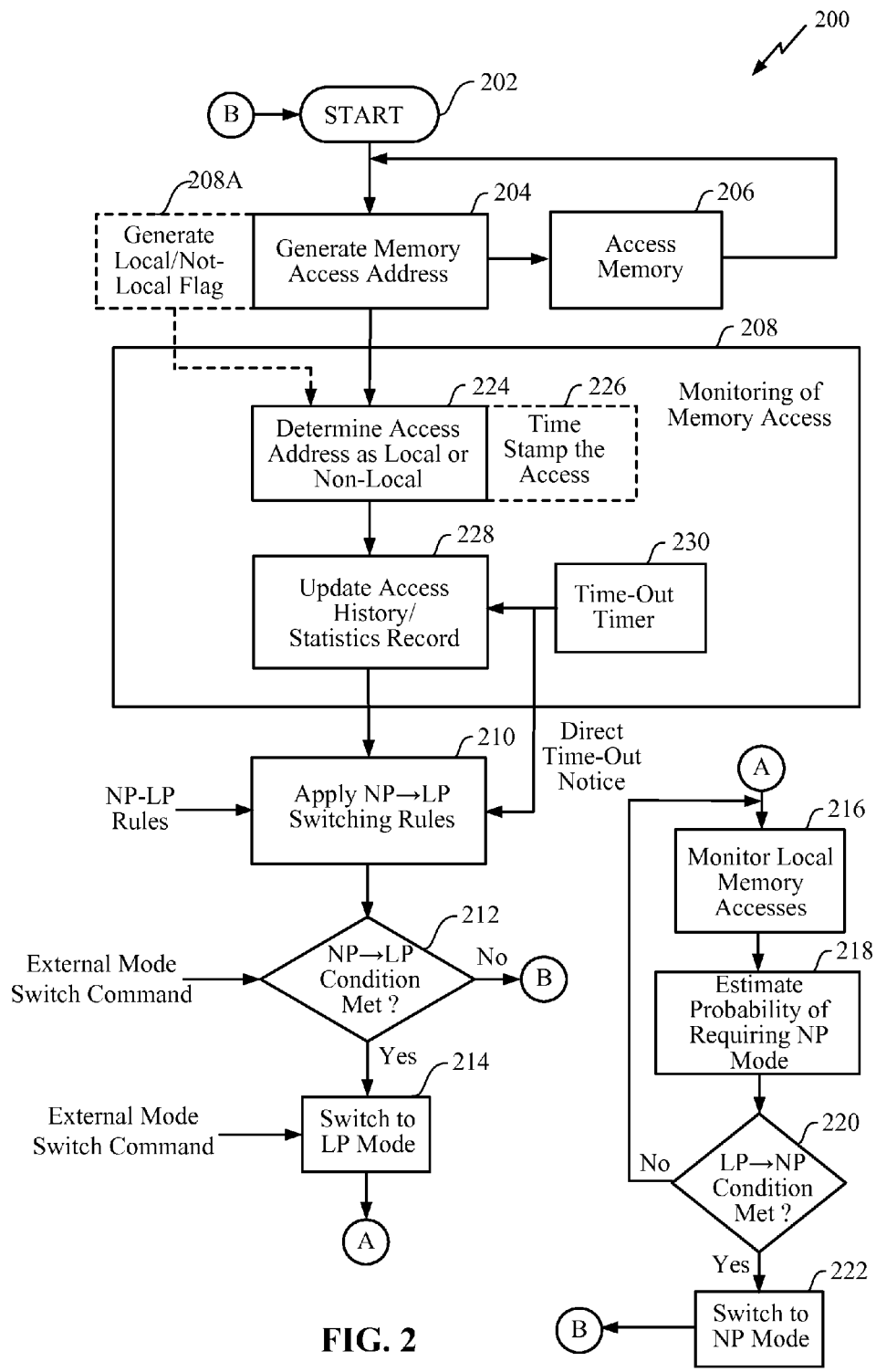
FIG. 2 shows a logical flow of example operations, referencing the FIG. 1 block schematic, in one process of switching between non-local memory access mode and local memory access mode in accordance with various aspects.

FIG. 2 shows one flow 200 of example operations, which will be described in reference to the FIG. 1 APMA processor 100, in one process of switching between the NP mode and LP mode in accordance with one or more aspects. It will be understood that description of the flow 200 in reference to the FIG. 1 block schematic is not intended to limit performance of the flow 200 to the APMA processor 100, or to any other specific processor.

The flow 200 will be described assuming a start state at 202 of the APMA processor 100 being in the NP mode. The flow 200 can proceed to 204 and generate, e.g., on the bus 104, an address to access, for example, one of the local memory 106 or the remote memory 108. Operations in generating the address at 204 may comprise, for example, the processor 102 generating a virtual address, the TLB 110 finding a matching virtual page translation entry 150, and the TLB 110 placing a corresponding physical address on the bus 104. The TLB 110 operation, however, is only one example of generating the address at 204. As illustration, generating the address at 204 may comprise the processor 102 directly generating a physical address (e.g., FIG. 1 alternate logical path 112) and placing it on the bus 104.

Upon generating the memory address at 204, the flow 200 may proceed along two flow paths. One of the flow paths can comprise, at 206, accessing the memory (e.g., one of the local memory 106 and the remote memory 108) using the address generated at 204, then returning to 204 to generate another memory address. The other of the two flow paths, after generating the address at 204, can comprise monitoring of the memory accesses to reflect the access at 206 associated with the address generated at 204 at 208, followed by applying, at 210, NP-to-LP switching rules to the updated monitoring. The flow 200 may then, at 212, determine whether application at 210 of the NP-to-LP switching rules to the results the monitoring shows that a given NP-to-LP switching condition or threshold is met. In an aspect, this be a logical "OR" of meeting any among a plurality of given NP-to-LP switching conditions or thresholds, or logical ""AND" of satisfying a conjunction of meeting conditions or thresholds, or both. In an aspect, NP-to-LP switching conditions or thresholds may be integrated into the NP-to-LP switching rules. Upon determining at 212 that the NP-to-LP switching conditions or thresholds are not met, the flow can return to the START at 202. Upon determining at 212 that one or more NP-to-LP switching conditions or thresholds being met, the flow 200 may proceed, as shown by the YES from the determining 212, to 214 and switch the APMA processor 100 from the NP mode to the LP mode. In an aspect, operations in switching the APMA processor 100 from the NP mode to the LP mode can include setting a mode register, for example, setting the access mode flag in the access mode register 114, to reflect the switch.

Continuing to refer to FIG. 2, in an aspect, after the APMA processor 100 switches at 214 to the LP mode, there may be another monitoring of memory accesses at 216. Referring to FIGS. 1 and 2, in an aspect, upon switching to the LP mode, memory accesses by the APMA processor 100 may be limited to the local memory 106. Regarding the configuration of the monitoring at 216, in an aspect the monitoring may be configured to detect characteristics of the LP-mode memory accesses that are determined, or are known from empirical data, as correlating with a probability of the APMA processor 100 requiring, or obtaining system benefit from, a switch back to the NP mode.

In an aspect, associated with, for example, updating (not separately visible in FIG. 2) of the monitoring memory accesses at 216, the flow may proceed to 218 and perform operations of estimating, based on the monitoring at 216, the probability of the APMA processor 100 requiring switch to the NP mode. The flow 200 may then proceed to 220 and determine whether the probability estimated at 218 meets a given threshold for switching the APMA processor 100 to the NP mode. In an aspect, as shown by the YES branch from 230, if operations at 220 determine the probability estimated at 218 meets a given threshold, the flow 200 may proceed to 222 and switch the APMA processor 100 to the NP mode. After the switching at 222 the flow can return to the START at 202. On the other hand, if operations at 220 determine the probability estimated at 218 does not meet the given threshold, the flow 200 may return to 216 and continue monitoring the LP mode memory accesses.

Referring to FIG. 2, in an aspect, the monitoring of memory access operations at 208 may comprise, for example, determining at 224 whether the address generated at 204 is to a local memory (e.g., local memory 106) or to a non-local memory (e.g., remote memory 108). In an aspect, the determining at 224 may be performed by a local//non-local mapping, such as described for the access detect and local/non-local map 118 of FIG. 1. In another aspect, the determining at 224 may use a memory location flag, for example, the above-described local/non-local flag field 152 that may be provided with the address generated at 204. In an aspect, operations in the monitoring at 208 can further comprise time-stamping, at 226, of the access associated with the address generated at 204. Time stamping may be performed, for example, by the access event timer 120 of the FIG. 1 LP/NP rule-based switch module 116.

Continuing to refer to FIG. 2, operations in the monitoring at 208 may further comprise updating, at 228, an access history/statistical record to reflect the access associated with the address generated at 204. The updating at 228 may reflect whether the access at 206 is to a local or non-local memory and, in an aspect, may reflect the time stamping at 226. The updating of the access history/statistical record at 228 may, for example, include an updating of the memory access history, or access statistics, or both, in the memory access historical/statistical record 122. In an aspect, the updating of the access history/statistical record at 228 can include, as described in reference to the memory access historical/statistical record 122, updating a frequency and quantity of memory accesses, and relative quantity and frequency of the memory accesses being to local or non-local memory.

In an aspect, operations in the monitoring at 208 may include updating to reflect intervals during which no addresses were generated. For example, at 230 a time-out timer may update the access history/statistical record with a notice that a given time-out has lapsed since the most recent memory access. Referring to FIG. 1, operations of the time-out timer at 230 may be performed, for example, by a timer feature (not separately visible in FIG. 1) of the access event timer 120. In an aspect, the time-out timer at 224 may be configured to determine a time-out with respect to generation at 204 of non-local addresses. For example, the time-out timer at 230 may be configured to update the access history/statistical record at 228 upon lapse of a given timeout since the most recent non-local access has been detected at 224. This feature can detect, for example, periods in which threads on the processor 102 have not required access to non-local memory. Examples of the timeout occurring include, but are not limited to, intervals when a smartphone is not being used or employed, for example, receipt of notice pushes. In another aspect, operations of the time-out timer at 230 may be configured to directly switch the APMA processor 100 to the LP mode upon detecting a given duration of no access of non-local memory. For example, referring to FIG. 1, a direct time-out notice line (not explicitly visible in FIG. 1) may be provided, from the access event timer 120 to the LP/NP switching decision logic 126.

Figure 3:
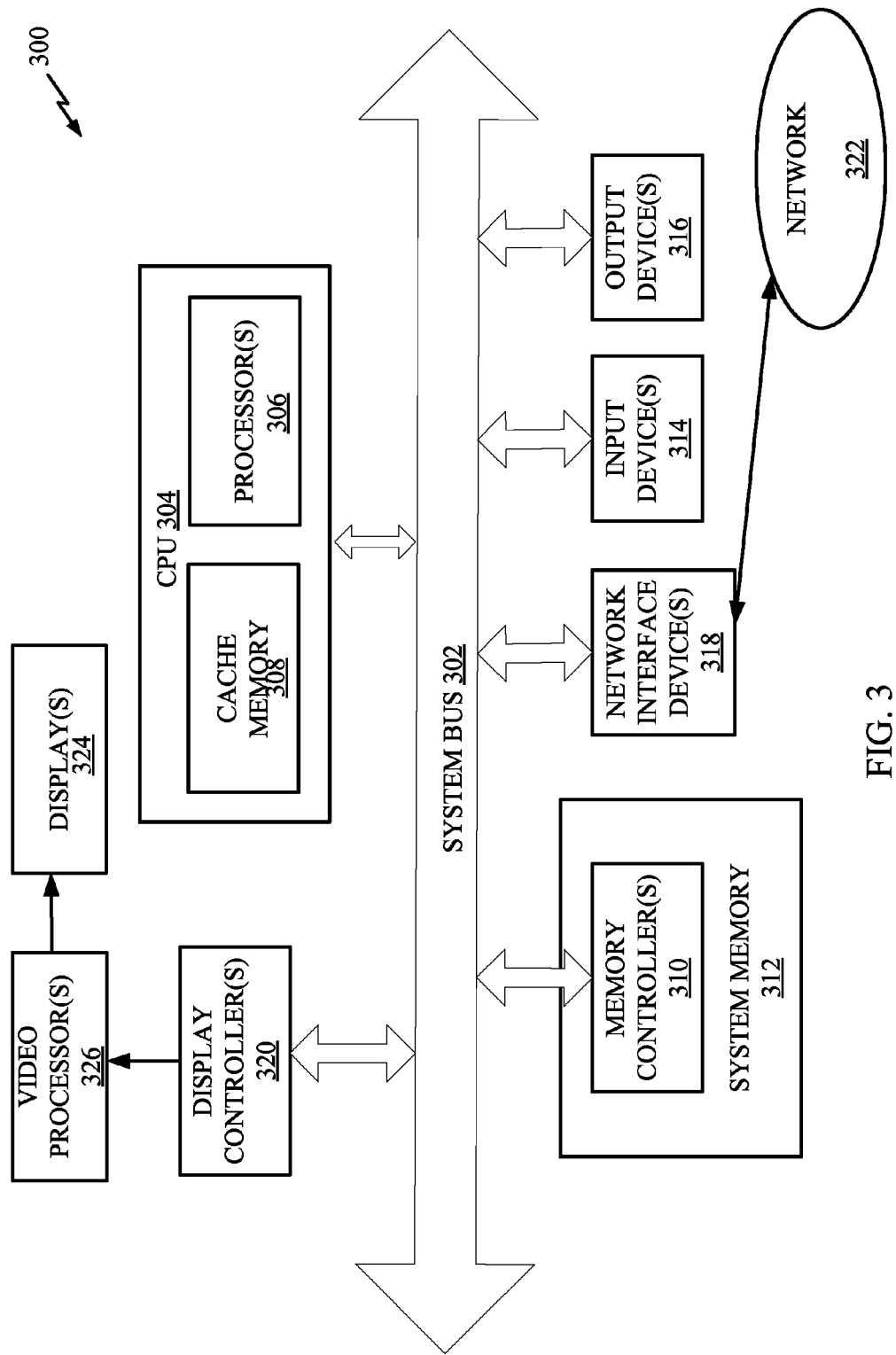
FIG. 3 shows a functional schematic of one example personal communication and computing device in accordance with various aspects.

FIG. 3 illustrates one example of a personal communication and computing device 300 that can be configured, as described herein, to support or provide an apparatus comprising features and functionalities described in reference to the FIG. 1 APMA processor 100. Referring to FIG. 3, the personal communication and computing device 300 can include a system bus 302 and, coupled to the system bus 302, one or more CPUs 304. The CPUs 304 may comprise, for example, one or more processors 306 and one or more cache memories 308. The processor(s) 306 may be implemented by, for example, one or more programmable computing devices such as, without limitation, one or more ARM-type processing devices (not separately visible in FIG. 3). The processor(s) 06 may capable of performing as a master device. The processor(s) 306 may be inter-coupled, for example through the system bus 302, to various master and slave devices. The CPUs 304 may, according to conventional communication protocols, communicate with these other devices by exchanging address, control, and data information over the system bus 302. Although not illustrated in FIG. 3, multiple system buses 302 may be provided. In examples having multiple system buses 302, each system bus 302 may constitute a different fabric.

Referring to FIG. 3, the CPU(s) 304 may communicate bus transaction requests to a memory controller 310 of a memory system 312 as one example of a slave device. Referring to FIGS. 1 and 3, in one aspect, the CPU(s) 304 may correspond to the processor 102 of FIG. 1. The CPU(s) 304 may be configured to include circuitry (not explicitly visible in FIG. 3) and/or computer-executable code (not explicitly visible in FIG. 3), implementing the processor 102, the local memory 106, and the LP/NP rule-based switch module 116. The memory system 312 may implement, or form a portion of, the remote memory 108.

Referring to FIG. 3, examples of other master and slave devices can include one or more input devices 314, one or more output devices 316, one or more network interface devices 318, and one or more display controllers 320. The input devices(s) 314, if employed, can include any type of input device, including but not limited to input keys, switches, voice processors, and the like. The output device(s) 316, if used, can include any type of output device, including but not limited to audio, video, other visual indicators and the like. The network interface device(s) 318, if used, can be any type of network interface device configured to allow exchange of data to and from a network 322. The network 322 can be any type of network, including but not limited to a wired or wireless network, a private or public network, a local area network (LAN), a wide area network (WLAN) and the Internet. The network interface device(s) 318 can be configured to support any type of communications protocol desired.

Continuing to refer to FIG. 3, the CPU(s) 304 may also be configured to access the display controller(s) 320 over the system bus 302 to control information sent to one or more displays 324. The display controller(s) 320 may send information to the display(s) 324 to be displayed, for example, via one or more video processors 326. The video processors 326 may. For example, process information to be displayed into a format suitable for the display(s) 324. The display(s) 324, if used, can include any type of display, for example, an active or passive liquid crystal display (LCD), a plasma display, and cathode ray tube (CRT).

The foregoing disclosed devices and functionalities may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with aspects disclosed herein may be implemented as electronic hardware, computer software, or combinations of both. Computer software may include a non-transitory computer-readable medium that comprises instructions, that when executed by a processor, can cause the processor to perform steps and related operations in accordance with described aspects. To clearly illustrate interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various methods, sequences and/or algorithms described herein may be implemented, for example, directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative examples and applications of the invention, it should be noted that various changes and modifications may be made herein without departing from the scope of the invention as defined by the appended claims. Functions, steps and/or actions recited in methods claimed need not be performed in any particular order. Further, although features may be described or claimed in the singular, the plural is contemplated unless limitation to the singular is explicitly stated.

What is claimed is:

1. A method of switching a memory access mode of a processor, the method comprising:
    generating a memory address for the process to perform a memory access, the memory address being generated in accordance with a current memory access mode which is one of a local memory access (LP) mode and a non-local memory access (NP) mode, wherein a range of memory addresses of the memory address is limited to a local memory when the current memory access mode is the LP mode, and the range of memory addresses of the memory address includes the local memory and a non-local memory when the current memory access mode is the NP mode;
    monitoring the memory access based on the memory address generated for the processor, wherein a result of the monitoring indicates whether the memory access is to the local memory or to the non-local memory; and
    switching the memory access mode for one or more subsequent memory accesses, in response to the monitoring the memory access, from the current memory access mode to a next memory access mode which is the other of the LP mode and the NP mode, wherein the local memory and the non-local memory are separate.

2. The method of claim 1, wherein the monitoring the memory access includes updating a memory access history.

3. The method of claim 2, wherein switching the memory access mode is based, at least in part, on applying ef switching rules to the memory access history.

4. The method of claim 3, wherein applying the switching rules to the memory access history comprises retrieving the switching rules from a switching rules storage.

5. The method of claim 4, further comprising updating the switching rules in the switching rules storage.

6. The method of claim 2,
    wherein the monitoring the memory access includes applying a time stamp to the memory access, and
    wherein updating the memory access history reflects the time stamp.

7. The method of claim 1, wherein the monitoring the memory access comprises detecting intervals, and wherein the intervals are of time without accesses of the local memory, or without access of the non-local memory, or both.

8. The method of claim 7, wherein the switching the memory access mode is based, at least in part, on a result of the detecting the intervals of time without accesses of the local memory, of without accesses of the non-local memory, or both.

9. The method of claim 7, wherein the switching the memory access mode is based, at least in part, on a result of the detecting the intervals of time without accesses of the local memory, or without accesses of the non-local memory, or both indicating an interval exceeding a given time-out limit.

10. The method of claim 9, further comprising: generating a direct time-out notice in response to detecting the intervals of time without accesses of the local memory, or without accesses of the non-local memory, or both that exceed the given time-out limit.

11. The method of claim 1, wherein the monitoring the memory access, when the current memory access mode is the NP mode, comprises:
    determining whether the memory access is to the local memory or to the non-local memory; and
    updating a memory access historical record to indicate a result of the determining.

12. The method of claim 11, wherein the switching the memory access mode from the NP mode to the LP mode is based, at least in part, on applying NP-to-LP switching rules to the memory access historical record.

13. The method of claim 11, further comprising:
    generating a memory location flag associated with the memory address contemporaneously with generating the memory address,
    wherein the memory location flag indicates whether the memory address is to the local memory or to the non-local memory, and
    wherein the determining whether the memory access is to the local memory or to the non-local memory is based on the memory location flag.

14. The method of claim 1, further comprising:
    estimating, based on a result of the monitoring the memory access, a probability of requiring switching the memory access mode,
    wherein the switching the memory access mode is based, at least in part, on a result of the estimating.

15. The method of claim 1, further comprising:
    when the memory access mode is in the LP mode, estimating, based on a result of the monitoring the memory access, a probability of requiring switching the memory access mode to the NP mode,
    wherein the switching the memory access mode to the NP mode is based, at least in part, on a result of the estimating.

16. The method of claim 1, wherein the switching the memory access mode comprises setting a mode register to a value indicating which among the LP mode and the NP mode to which the memory access mode is switched.

17. The method of claim 16,
    wherein the switching the memory access mode includes selecting as selected switching rules, based on the value in the mode register, NP-to-LP switching rules when operating in the NP mode and LP-to-NP switching rules when operating in the NP mode, and
    wherein the switching the memory access mode is based, at least in part, on applying the selected switching rules to a result of the monitoring.

18. The method of claim 16, further comprising updating the LP-to-NP switching rules, or updating the NP-to-LP switching rules, or both.

19. An apparatus for automatic, rule-based switching a memory access mode of a processor, the apparatus comprising:
- a switching rules storage configured to store switching rules, the switching rules comprising rules for switching the memory access mode of the processor from a current memory access mode to a next memory access mode, the current memory access mode being one of a local memory access (LP) mode and a non-local memory access (NP) mode and the next memory access mode being the other of the LP mode and the NP mode;
- a memory access record storage configured to store memory access history, or memory access statistics, or both, wherein the memory access record storage is configured to be updated in associated with the processor access memory in accordance with the current memory access mode, the update reflecting whether the accessing is to a local memory or to a non-local memory; and
- a switching decision circuit coupled to the switching rules storage and to the memory access record storage, wherein the switching decision circuit is configured to switch the memory access mode of the processor for one or more subsequent memory accesses from the current memory access mode to the next memory access mode, based at least in part on the switching rules stored in the switching rules storage and the memory access record stored in the memory access record storage, wherein memory accessible by the processor is limited to the local memory when the current memory access mode is the LP mode, wherein both the local memory and the non-local memory are both accessible by the processor when the current memory access mode is the NP mode, and wherein the local memory and the non-local memory are separate.

20. The apparatus of claim 19, further comprising a local/non-local map circuit configured to receive an address associated with the processor accessing the local memory and the non-local memory, and determine, in response to the address, whether the accessing is to the local memory or to the non-local memory.

21. The apparatus of claim 19, further comprising an access event time configured to apply a time stamp to an access by the processor of the local memory, or to an access by the processor of the non-local memory, or both, and update the memory access record storage to reflect the time stamp.

22. The apparatus of claim 21, wherein the access event timer is further configured to generate a direct time-out notice in response to an interval of time of no memory accesses by the processor having duration that exceeds a time-out.

23. The apparatus of claim 22, wherein the switching decision logic is further configured to switch the memory access mode of the processor in response to the direct time-out notice.

24. The apparatus of claim 21, wherein the access event timer is further configured to determine, when the memory access mode of the processor is in the NP mode, intervals of time of no access by the processor of the non-local memory, and generate a direct time-out notice in response to the intervals of time of no access by the processor of the non-local memory having a duration that exceeds a time-out, and wherein the switching decision logic is further configured to switch the memory access mode of the processor from the NP mode to the LP mode in response to the direct time-out notice.

25. The apparatus of claim 19, wherein the switching decision logic is further configured to receive an external mode switch command and, in response, to switch the memory access mode of the processor in accordance with the external mode switch command.

26. An apparatus for automatic, rule-based switching a memory access mode of a processor, the apparatus comprising:
- means for generating a memory address for the processor to perform a memory access, the memory address being generated in accordance with a current memory access mode which is one of a local memory access (LP) mode and a non-local memory access (NP) mode, wherein a range of memory addresses of the memory address is limited to a local memory when the current memory access mode is the LP mode, and the range of memory addresses of the memory address includes the local memory and a non-local memory when the current memory access mode is the NP mode;
- means for monitoring memory access based on the memory address generated for the processor, wherein a result of the monitoring indicates whether the memory access is to the local memory or to the non-local memory; and
- means for switching the processor for one or more subsequent memory accesses, in response to the monitoring the memory access, from the current memory access mode to a next memory access mode which is the other of the LP mode and the NP mode, wherein the local memory and the non-local memory are separate.

27. The apparatus of claim 26, further comprising:
- means for estimating a probability, based at least in part on a result of the monitoring accesses of the local memory or accesses of the non-local memory, or both, of requiring switching the memory access mode, and
- wherein the means for switching the memory access mode is configured to switch the memory access mode of the processor based, at least in part, on the estimated probability.

28. A non-transitory computer-readable medium comprising code, which, when executed by a processor, causes the processor to:
- generate a memory address to perform a memory access, the memory address being generated in accordance with a current memory access mode which is one of a local memory access (LP) mode and a non-local memory access (NP) mode, wherein a range of memory addresses of the memory address is limited to a local memory when the current memory access mode is the LP mode, and the range of memory addresses of the memory address includes the local memory and a non-local memory when the current memory access mode is the NP mode;
- monitor memory access based on the memory address for a processor system, wherein a result of the monitoring indicates whether the memory access is to the local memory or to the non-local memory; and
- switch a memory access mode of the processor system for one or more subsequent memory accesses, in response to the monitoring the memory access, from the current memory access mode to a next memory access mode which is the other of the local memory access mode and the non-local memory access mode, wherein the local memory and the non-local memory are separate.

29. The method of claim 11, wherein generating the memory address comprises:

providing a virtual address to a translation lookaside buffer (TLB) configured to store a plurality of virtual translation entries, each virtual translation entry comprising a virtual address entry, a physical address entry, and a memory location flag entry indicating whether a physical address in the physical address entry it so is to the local memory or to the non-local memory;

outputting the physical address corresponding to the virtual address as the memory address; and outputting the memory location flag corresponding to the virtual address contemporaneously with the physical address, and wherein monitoring the memory access comprises determining whether the memory access is to the local memory or to the non-local memory based on the memory location flag.

30. The apparatus of claim 19, wherein the processor is configured to generate a virtual address, wherein the apparatus further comprises a translation lookaside buffer (TLB) and a map, wherein the TLB is configured to store a plurality of virtual translation entries, each virtual translation entry comprising a virtual address entry, a physical address entry, and a memory location flag entry indicating whether a physical address in the physical address entry is to the local memory of to the non-local memory, output the physical address corresponding to the virtual address as the memory address; and output the memory location flag corresponding to the virtual address contemporaneously with the physical address, and wherein the map is configured to detect whether the memory access is to the local memory or to the non-local memory based on the memory location flag.

31. The apparatus of claim 26, wherein the means for generating the memory address comprises:

means for providing a virtual address to a translation lookaside buffer (TLB) configured to store a plurality of virtual translation entries, each virtual translation entry comprising a virtual address entry, a physical address entry, and a memory location flag entry indicating whether a physical address in the physical address entry is to the local memory or to the non-local memory;

means for outputting the physical address corresponding to the virtual address as the memory address; and means for outputting the memory location flag corresponding to the virtual address contemporaneously with outputting the physical address, and wherein the means for monitoring determines whether the memory access is to the local memory or to the non-local memory based on the memory location flag.

32. The non-transitory computer-readable medium of claim 28, wherein the processor has access to a translation lookaside buffer (TLB) configured to store a plurality of virtual translation entries, each virtual translation entry comprising a virtual address entry, a physical address entry, and a local/non-local memory location flag entry indicating whether a physical address in the physical address entry is to the local memory or to the non-local memory, and wherein the non-transitory computer-readable medium further comprises code to cause the processor to:

provide a virtual address to the TLB, output the physical address corresponding to the virtual address as the memory address, output the memory location flag corresponding to the virtual address contemporaneously with the physical address, and determine whether the memory access is to the local memory or to the non-local memory based on the memory location flag.

* * * * *